Figures 1, 2:
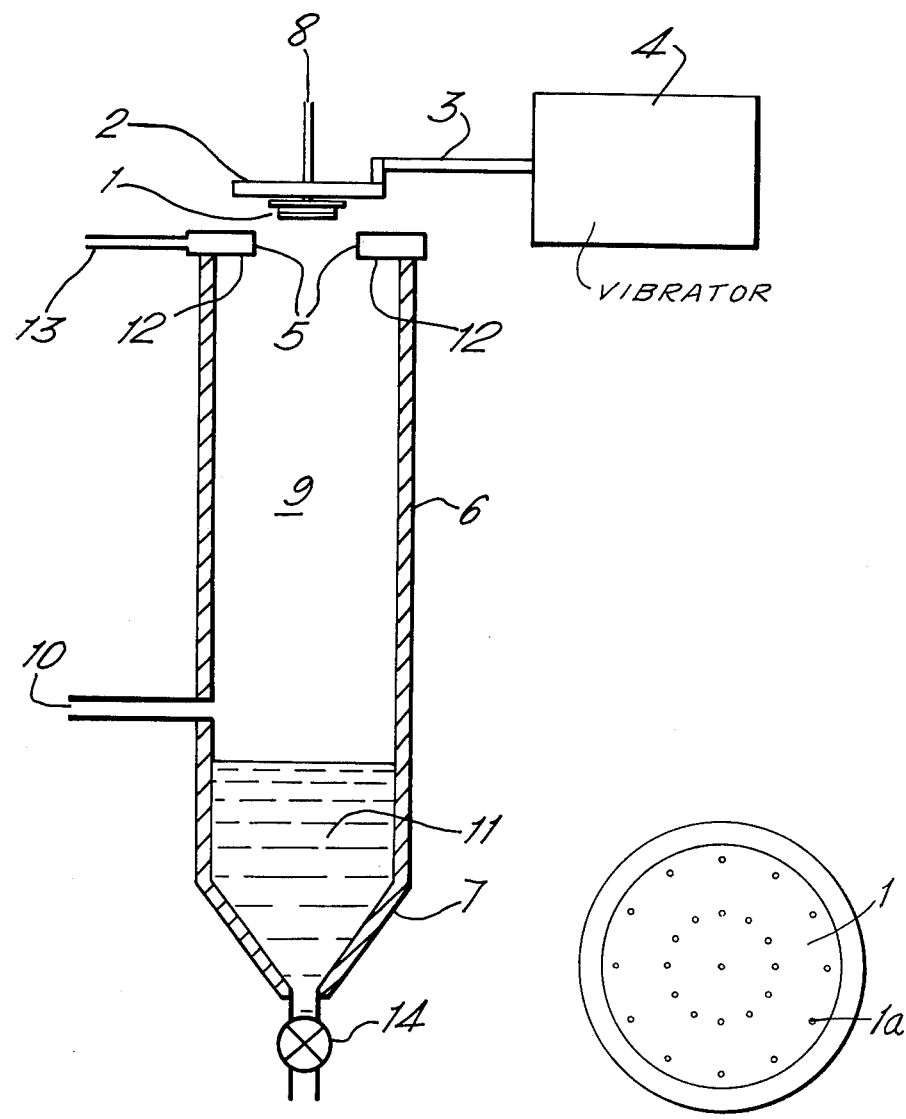

United States Patent [19]

Wace

[11] 4,043,507
[45] Aug. 23, 1977

[54] APPARATUS FOR THE FORMATION OF LIQUID DROPLETS

[75] Inventor: Peter Frederick Wace, Oxford, England

[73] Assignee: United Kingdom Atomic Energy Authority, London, England

[21] Appl. No.: 520,091

[22] Filed: Nov. 1, 1974

Related U.S. Application Data

[63] Continuation of Ser. No. 246,662, April 24, 1972, abandoned.

[30] Foreign Application Priority Data

May 5, 1971 United Kingdom .............. 13373/71

[51] Int. Cl.² ........................................ G01D 15/18
[52] U.S. Cl. ................................... 239/102; 239/4
[58] Field of Search ................. 239/102, 4, 222.11, 239/383, 389, 214

[56] References Cited

U.S. PATENT DOCUMENTS

| 3,085,749 | 4/1963 | Schweitzer et al. | 239/222.11 |
| 3,256,677 | 6/1966 | Boucher et al. | 239/4 |
| 3,361,352 | 1/1968 | Harris | 239/102 |
| 3,458,135 | 7/1969 | Beals | 239/222.11 |
| 3,709,432 | 1/1973 | Robertson | 239/102 |
| 3,739,393 | 6/1973 | Lyon et al. | 239/102 |

FOREIGN PATENT DOCUMENTS 977,128  12/1964  United Kingdom ............. 239/102

Primary Examiner—Richard A. Bertsch
Attorney, Agent, or Firm—Larson, Taylor and Hinds

[57] ABSTRACT

There is disclosed an apparatus and method for the production of particles wherein liquid droplets, to be formed into particles, are produced by the ejection of liquid out of the orifices of a spinnerette which is vibrated.

12 Claims, 2 Drawing Figures

APPARATUS FOR THE FORMATION OF LIQUID DROPLETS

This is a continuation of application Ser. No. 246,662 filed Apr. 24, 1972, now abandoned.

This invention relates to apparatus for the formation of liquid droplets.

It is known that in certain areas of manufacture, for example in the production of spheres by sol/gel processes and in spray drying operations, there is a requirement for the rapid production of liquid droplets which may be subsequently treated to produce the desired product, for example by reaction with reagents or by other operations such as heating.

The principle of rapid droplet formation which comprises the ejection of a liquid through an orifice as a jet which is simultaneously vibrated is well known, but methods based on this principle suffer from the disadvantage that with small droplets and small orifices the overall yield is low in a given period of time.

An object of the present invention is the provision of apparatus which enables a much larger yield to be obtained.

According to the present invention there is provided apparatus for the formation of liquid droplets by the ejection of liquid out of an orifice, comprising a spinnerette having a plurality of orifices and means for vibrating the spinnerette. The spinnerette may have, for example, in a diameter of 1 cm, six orifices; and the vibration may be linear, i.e. either transverse or axial with respect to the jets.

If a plurality of conventional separate jets, for example hypodermic syringe needles, are arranged together to provide a plurality of orifices and it is contrived to vibrate these jets to form droplets, practical problems arise from the difficulties of vibrating the considerable mass which the jets constitute at suitable frequencies for the satisfactory formation of droplets. In addition, great accuracy and uniformity is required in orifice size and relative positioning of the orifices to ensure uniformity of droplet size and to reduce the risk of interaction between adjacent liquid streams ejected therefrom. The use of a spinnerette substantially overcomes these difficulties by providing a plurality of uniform and accurately positioned orifices on a comparatively small, light-weight dropping head.

In order that the invention may be clearly understood, one embodiment thereof will now be described, by way of example, with reference to the accompanying drawings, in which:

FIG. 1 is a diagrammatic representation of an apparatus for which one application is the production of nuclear fuel particles, and FIG. 2 is a diagrammatic, enlarged view of the understood of the conventional spinnerette as used in the apparatus of FIG. 1.

Referring now to the drawings, the apparatus comprises a spinnerette 1, provided with a plurality of orifices 1a (see FIG. 2), similar to that used in the rayon spinning industry, mounted on a light-weight frame 2 which is connected via link 3 with an electromagnetic vibrator 4. The link 3 is a linkage, e.g. a rod or bar, connected to the frame 2 and the vibrator 4 so as to transmit mechanically the vibrations produced by the vibrator 4 to the frame 2 and hence the spinnerette 1. The spinnerette 1, thus mounted, as is evident in FIG. 1, with the bottom thereof oriented essentially horizontally is positioned over a circular aperture 5 which provides access to a cylindrical column 6 having a conical lower section 7. In operation, liquid to be formed into droplets and then reacted with reagents to produce particles is fed to the vibrating spinnerette 1 through tube 8, and is ejected through the orifices 1a (See FIG. 2). The droplets so formed fall into the column 6 through aperture 5. The spinnerette 1 is positioned sufficiently far away from the aperture 5 to ensure that the drops have time to assume a spherical shape before entering the reaction zone. The column has an upper region 9 which is filled with a reagent gas by means of inlet 10. Droplets of solution react with the gas on contact and form partially gelled spheres which are sufficiently robust to withstand falling, without disruption, into liquid reagent 11 in which the gelation reaction proceeds.

To prevent the release of large amounts of reagent gas from the top of the column 6, and thus prevent premature gelling of partially formed drops or the blocking of the orifices of spinneret 1 by the gelling of liquid before it leaves the orifices, there is provided an annular withdrawal system 12 which is evacuated by means of a plurality of pipes, one of which is shown at 13. The annular withdrawal system 14 is in the form of an annular chamber having an inner wall defining the aperture 5. In operation, the chamber is evacuated by means of the pipes 13 and gas tending to pass upwards from the column 6 through the aperture 5 is drawn into the annular chamber and thereby removed through the pipes 13. The release of large amounts of reagent gas from the top of the column 6 is thereby substantially avoided. The gas flow system can be an up-flow one, as illustrated here, or a down-flow one. The gelled spheres may be withdrawn from a lower region of the column by suitable valve and pipe arrangement represented at 14.

In one example of the use of the present invention a uraniferous feed solution was pumped at rates varying between 37 and 74 ml/min through a 19-hole spinnerette. The spinnerette was vibrated axially at frequencies between 4000 and 8000 Hz, the frequency being proportional to the flow rate. Drops of 260 $\mu$m diameter were produced from all the holes, and were formed by the regular break-up into short length of a continuously moving liquid jet issuing from each hole. The holes were 0.0127 cm in diameter and the maximum fluid velocity through the holes was therefore, in the 74 m./min case, 518 cm/sec. The apparatus is known to operate satisfactorily at higher fluid velocities if required. It will be deduced that one drop was formed from each jet for every imposed vibration cycle. Although it is possible to produce drops by other modes of jet break-up (e.g. $\frac{1}{2}$, 2, 3, 4, etc. imposed vibration cycles per drop produced), it is preferred to operate at 1 drop per cycle.

An example of the nuclear fuels which may be produced by using the above apparatus is uranium dioxide. In this case a suitable spinnerette may provide two holes and be laterally vibrated at 6000 cycles per second. The solution may be uranyl nitrate plus one or more suitable gelling agents, supplied at a flow rate of $\frac{1}{6}$ ml/sec (i.e. 10 ml/min per hole), the gas in region 9 is then desirably ammonia and the liquid 11 is ammonium hydroxide.

Reference should be made to our British Patents Nos. 1,175,834, 1,231,385 and 1,253,807 for information regarding gelling agents, i.e. agents for imparting to a solution the property of gelling in the presence of a suitable reagent, e.g. ammonia.

The method of producing nuclear fuel particles in this example comprises the steps of ejecting the uranyl nitrate-plus-additives solution through the orifices of a spinnerette, simultaneously vibrating the spinnerette, causing the droplets so formed to assume spherical shape and then fall through a region in a column wherein they are contacted and caused to react with ammonia gas, allowing the partially gelled spheres to fall into another region in the column wherein they are contacted with ammonium hydroxide in which the gelation is completed, and removing the gel spheres from a lower region of the column.

I claim:

1. Apparatus for the formation of liquid droplets comprising:
    ejection means for ejecting downwardly a plurality of continuously moving jets of liquid, said ejection means comprising a lightweight dropping head in the form of a spinnerette having a plurality of orifices of highly uniform and accurate orifice size and position,
    and break-up means for breaking up the continuously moving jets leaving the orifices, into short lengths which then form into droplets subsequent to their formation into short lengths, said break-up means comprising a means for vibrating the spinnerette as the said continuously moving liquid jets are issuing therefrom.

2. Apparatus according to claim 1, wherein the orifices are located in an essentially horizontal plane, and wherein said means for vibrating comprises means for vibrating the spinnerette linearly transversely or axially with respect to the plane of the orifices while maintaining said plane essentially horizontal.

3. Apparatus according to claim 1, wherein the means for vibrating the spinnerette is an electromagnetic vibrator mechanically connected to the spinnerette.

4. Apparatus for the production of particles of uniform size by gelling of droplets of liquid, comprising:
    ejection means for ejecting downwardly a plurality of continuously moving jets of liquid, said ejection means comprising a lightweight dropping head in the form of a spinnerette having a plurality of orifices of highly uniform and accurate orifice size and position, and including break-up means for breaking up the continuously moving jets leaving the orifices, into short lengths, said break-up means comprising a means for vibrating the spinnerette as the said continuously moving liquid jets issue therefrom,
    and including means for supplying a liquid to be gelled to the spinnerette and, in association with the spinnerette, a column for containing a reagent capable of causing the liquid to be gelled to gel, the column being spaced downwardly from the spinnerette a sufficient distance to permit the said short lengths to form into droplets before passing into the column.

5. Apparatus according to claim 4, wherein the column is arranged to contain a gaseous reagent and a liquid reagent.

6. Apparatus according to claim 4, wherein the means for vibrating the spinnerette is an electromagnetic vibrator mechanically connected to the spinnerette.

7. Apparatus according to claim 4, wherein said column comprises means for inhibiting the release of reagent gas from the top of the column.

8. A method for forming liquid droplets comprising:
    ejecting downwardly a plurality of jets of liquid by passing the liquid continuously through a plurality of orifices of a light-weight dropping head in the form of a spinnerette,
    and breaking up the continuously moving liquid jets into short lengths by vibrating the spinnerette to vibrate the jets passing therethrough, and subsequently forming the short lengths into droplets by falling downwardly after said breaking up step.

9. A method according to claim 8, wherein the liquid is a liquid to be gelled, and including the step of supplying said liquid to the spinnerette for said ejection into liquid jets, and including contacting the droplets thus formed with a reagent capable of gelling the liquid to thus cause the droplets to gel.

10. A method according to claim 9, wherein the droplets are partially gelled by contacting a gaseous reagent and are then contacted with a liquid reagent wherein the gelling of the droplets is completed.

11. A method according to claim 10, wherein ammonia gas is the gaseous reagent and ammonium hydroxide is the liquid reagent.

12. A method according to claim 9, wherein the liquid droplets to be gelled contain a nuclear fuel material.

* * * * *